(12) United States Patent
Jarjoura et al.

(10) Patent No.: US 11,994,894 B2
(45) Date of Patent: May 28, 2024

(54) PEDAL ASSEMBLY WITH PYROTECHNIC RELEASE

(71) Applicant: VENTRA GROUP, CO., Halifax (CA)

(72) Inventors: Steve Jarjoura, Barrie (CA); Terry Reid, Oro-Medonte (CA); Joaquin Hung, Markham (CA)

(73) Assignee: VENTRA GROUP CO., Halifax (CA)

( * ) Notice: Subject to any disclaimer, the term of this patent is extended or adjusted under 35 U.S.C. 154(b) by 0 days.

(21) Appl. No.: 17/986,258

(22) Filed: Nov. 14, 2022

(65) Prior Publication Data
US 2023/0234527 A1    Jul. 27, 2023

Related U.S. Application Data

(60) Provisional application No. 63/302,371, filed on Jan. 24, 2022.

(51) Int. Cl.
*G05G 1/30*    (2008.04)
*B60K 26/02*    (2006.01)
(Continued)

(52) U.S. Cl.
CPC .............. *G05G 1/327* (2013.01); *B60R 21/09* (2013.01); *B60T 7/065* (2013.01); *B60K 26/02* (2013.01)

(58) Field of Classification Search
CPC ............ G05G 1/30; G05G 1/32; G05G 1/323; G05G 1/327; B60R 21/09; B60T 7/06; B60T 7/065; B60K 26/02
See application file for complete search history.

(56) References Cited

U.S. PATENT DOCUMENTS 6,182,525 B1    2/2001    Bowers et al.
6,786,109 B2 *    9/2004    Mueller .................. B60T 7/065
                                                                74/513
(Continued)

FOREIGN PATENT DOCUMENTS

CN    102101471 A    6/2011
DE    19616845 A1 *    11/1997    .............. B60T 7/065
(Continued)

OTHER PUBLICATIONS

2022 Nissan Kicks SV: Is the Kicks Worth Buying? https://www.youtube.com/watch?v=2a1nzsx4M8c.
(Continued)

*Primary Examiner* — Adam D Rogers
(74) *Attorney, Agent, or Firm* — Pillsbury Winthrop Shaw Pittman, LLP

(57) ABSTRACT

A pedal assembly actuates a rigid actuator of a functional system in a motor vehicle. The assembly comprises a mounting bracket having spaced apart support members defining a pedal receiving space. A pedal arm has a pedal pad and an actuator connector. A pair of retainer brackets are normally in a retaining position secured against front-rear movement. At least one pivot pin pivotally connects the proximal end of the pedal arm to the retainer brackets. A pyrotechnic actuator has an input for receiving an actuating signal and when triggered enables deformation of the retainer bracket to a releasing position wherein the retainer brackets permit the at least one pivot pin and the proximal end of the pedal arm to move rearwardly with respect to the mounting bracket. The pyrotechnic actuator may also be arranged with respect to a releasable connector to drive it for disconnection from the retainer brackets to permit the retainer brackets, the at least one pivot pin and the proximal end of the pedal arm to move rearwardly.

35 Claims, 10 Drawing Sheets

(51) Int. Cl.
  *B60R 21/09* (2006.01)
  *B60T 7/06* (2006.01)
  *G05G 1/327* (2008.04)

(56) References Cited

U.S. PATENT DOCUMENTS

| | | | |
|---|---|---|---|
| 7,954,589 B2 | 6/2011 | Sand et al. | |
| 8,381,862 B2 * | 2/2013 | Hjerpe | G05G 1/32 |
| | | | 180/274 |
| 8,887,857 B2 | 11/2014 | Kapoes et al. | |
| 9,213,354 B2 * | 12/2015 | O'Neill | B60K 26/02 |
| 10,696,259 B2 * | 6/2020 | Amirian | G05G 1/32 |
| 10,960,858 B2 | 3/2021 | Jarjoura et al. | |
| 11,358,550 B2 * | 6/2022 | Alonso Alonso | G05G 1/44 |
| 2004/0251662 A1 * | 12/2004 | Burgstaler | B60T 7/065 |
| | | | 280/730.1 |
| 2007/0137915 A1 | 6/2007 | Sanagi et al. | |
| 2019/0322250 A1 | 10/2019 | Jarjoura et al. | |
| 2020/0017054 A1 | 1/2020 | Amirian | |

FOREIGN PATENT DOCUMENTS

| | | | | |
|---|---|---|---|---|
| DE | 102011082148 A1 * | 3/2013 | | B60R 21/09 |
| DE | 102011082150 A1 * | 3/2013 | | B60R 21/09 |
| DE | 102011082153 A1 * | 3/2013 | | B60R 21/09 |
| DE | 102011082154 A1 * | 3/2013 | | B60R 21/09 |
| DE | 102017200986 A1 * | 7/2018 | | |
| DE | 102017200989 A1 * | 7/2018 | | |
| EP | 0983912 A1 * | 3/2000 | | |
| EP | 1253051 A1 * | 10/2002 | | B60R 21/09 |
| EP | 2594440 A1 * | 5/2013 | | B60R 21/09 |
| FR | 2750093 A1 * | 12/1997 | | B60R 21/09 |
| WO | WO-0078583 A2 * | 12/2000 | | B60K 26/02 |

OTHER PUBLICATIONS

Run-Off Road Protection https://www.media.volvocars.com/global/en-gb/media/videos/148246/run-off-road-protection3.
Extended European Search Report dated Jun. 30, 2023, issued in corresponding European Patent Application No. 22209752.9 (8 pgs.).

* cited by examiner

PEDAL ASSEMBLY WITH PYROTECHNIC RELEASE

CROSS-REFERENCE TO RELATED APPLICATIONS

This application claims priority to U.S. Provisional Application No. 63/302,371, filed Jan. 24, 2022, the subject matter of which is incorporated herein by reference in its entirety.

FIELD OF THE INVENTION

The present application relates to a pedal assembly with a pyrotechnic release feature.

BACKGROUND OF THE INVENTION

Pedal assemblies have been designed to address vehicle impact. For example, for vehicle systems actuated by a rigid actuator connected to a pedal, such as brake booster systems, when the vehicle is involved in a front-end collision the rigid actuator can be driven rearwardly, transferring kinetic energy to the driver's foot and lower leg.

U.S. Pat. No. 10,960,858 discloses a mechanical solution to this issue, where the kinetic energy causes mechanical release of a plate to allow the upper or proximal end of the pedal arm to be released. This enables the kinetic energy to preferentially disconnect the pedal arm, limiting the amount transferred to the driver's foot and lower leg.

Approaches using pyrotechnic actuators have been attempted. Pyrotechnic actuators are fast-responding, and are commonly used in air bags for activation during a vehicle collision.

U.S. Pat. No. 6,182,525 discloses a system attempting to move the pedal assembly entirely away from the driver. This is an unworkable solution and presented only schematically. Such a design would require both the extra space to allow for relocation of the pedal assembly, as well as a pedal assembly design that is amenable to relocation.

U.S. Pat. No. 7,954,589 discloses a pyrotechnically actuated pedal assembly. This patent discloses an approach where the primary mounting bracket is broken apart, e.g., side parts are ejected, to release the pedal arm. This approach has complexities in that the pyrotechnic charge must be rather substantial to break the mounting bracket, or the mounting bracket must be designed structurally weaker at the pedal's connection area so that a smaller charge can be used. Generally, it is desirable to use a smaller charge in an area near the driver's body, but it is also desirable to have a strong and robust mounting bracket for the pedal. These competing desires make implementation of the '589 patent challenging.

U.S. Pat. No. 8,887,857 discloses a complicated design with side plates and rotating lock handles, which requires the pyrotechnic feature to function as part of the structure that secures the pedal arm in place for normal operation. Also, after pyrotechnic release, the pedal arm is still retained between the side plates, with the pivot location shifting. Thus, it is not a full release.

Each of the patents/applications mentioned herein are incorporated by reference in their entirety.

SUMMARY OF THE INVENTION

One aspect of the invention provides a pedal assembly for actuating a rigid actuator of a functional system in a motor vehicle. The pedal assembly comprises a mounting bracket for mounting the assembly in the vehicle. The mounting bracket has spaced apart support members defining a pedal receiving space therebetween. A pedal arm has a pedal pad at a distal end thereof for engagement by a driver's foot. The pedal arm also has an actuator connector between the distal end and the proximal end for connection to the rigid actuator. At least one support pin couples to the mounting bracket. A pair of retainer brackets is on opposing sides of the proximal end of the pedal arm, each retainer bracket normally being in a retaining position retained on the at least one support pin against movement in a front-rear direction with respect to the mounting bracket. At least one pivot pin pivotally connects the proximal end of the pedal arm to the pair of retainer brackets.

A pyrotechnic actuator has an input for receiving an actuating signal to trigger the pyrotechnic actuator. The pyrotechnic actuator is arranged with respect to the retainer brackets such that the pyrotechnic actuator when triggered enables deformation of the retainer brackets to a releasing position wherein the retainer brackets permit the at least one pivot pin and the proximal end of the pedal arm to move rearwardly with respect to the mounting bracket.

Another aspect of the present invention also provides a pedal assembly for actuating a rigid actuator of a functional system in a motor vehicle. The pedal assembly comprises a mounting bracket for mounting the assembly in the vehicle. The mounting bracket has spaced apart support members defining a pedal receiving space therebetween. A pedal arm has a pedal pad at a distal end thereof for engagement by a driver's foot. The pedal arm also has an actuator connector between the distal end and the proximal end for connection to the rigid actuator. A pair of retainer brackets is on opposing sides of the proximal end of the pedal arm. A releasable connector connects forward ends of the retainer brackets to secure the retainer brackets normally against movement in a front-rear direction with respect to the mounting bracket. At least one pivot pin pivotally connects the proximal end of the pedal arm to the pair of retainer brackets.

A pyrotechnic actuator has an input for receiving an actuating signal to trigger the pyrotechnic actuator. The pyrotechnic actuator is arranged with respect to the releasable connector such that the pyrotechnic actuator when triggered drives the releasable connector to disconnect from the retainer brackets, permitting the retainer brackets, the at least one pivot pin and the proximal end of the pedal arm to move rearwardly with respect to the mounting bracket.

Another aspect of the present invention provides a pedal assembly configured to retain a level of functionality or control after a collision. In such a design, pressing the pedal pad after a collision would still allow some control over the system that the pedal operates. This type of design is preferable when the vehicle is otherwise capable of some level of operation after a collision and the driver still needs to use any of the pedals.

Other objects, aspects, and feature of the present invention will become apparent from the following detailed description, the accompanying drawings, and the appended claims.

DETAILED DESCRIPTION OF THE ILLUSTRATED EMBODIMENT(S)

Figure 1:
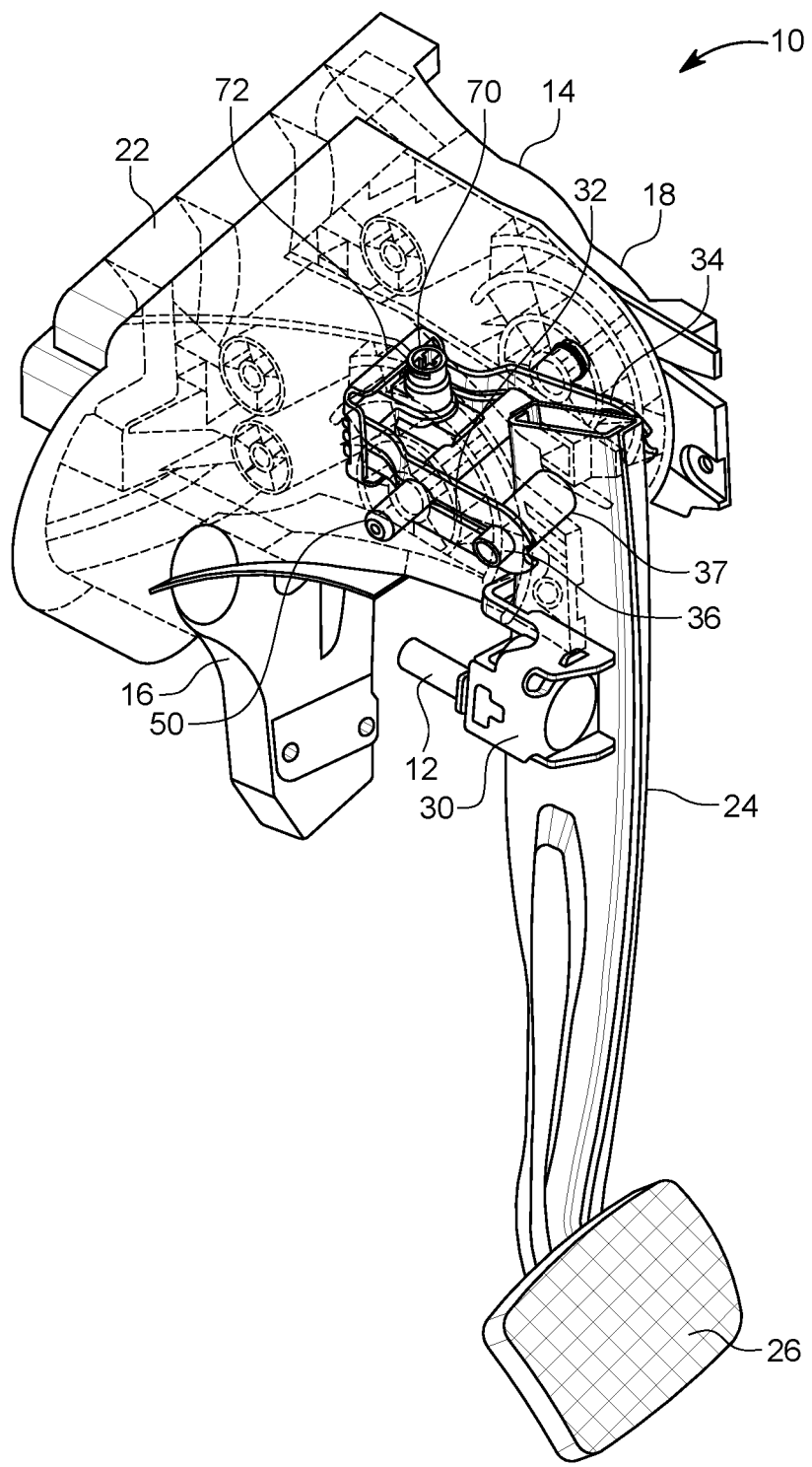
FIG. 1 is a perspective view of an embodiment of a pedal assembly, with the mounting bracket shown in transparent.

The present application discloses a pedal assembly 10 for installation in the passenger compartment of a motor vehicle, such as passenger car, truck, etc. The pedal assembly 10 is used for actuating a rigid actuator 12 of a functional system in the motor vehicle. Such a rigid actuator 12 will typically be a brake actuator rod, such as is commonly used to actuate a brake booster system and is well known in the art. The actuator 12 could also be a rod or other rigid actuator used to control power (e.g., the amount of fuel delivered to an engine, connected to the accelerator pedal) or the clutch of a manual transmission. For convenience, the illustrated embodiment is described with reference to a brake pedal assembly where the rigid actuator 12 is a brake booster rod. This brake pedal assembly context also benefits from the invention because drivers in front-end collision situations often depress the brake pedal, so the driver's foot is forcibly engaged with the brake pedal. The driver could also have his/her foot aligned with and just about the engage the brake pedal (e.g., he/she has switched his/her foot from the accelerator pedal and is over the brake pedal, but has not depressed it yet). Either situation can experience the relative movement between the driver's foot/lower leg and the rigid actuator towards one another, which may cause a transfer of kinetic energy from the rigid actuator to the driver's foot/lower leg via the pedal arm. Thus, the advantage discussed herein of releasing the pedal arm's proximal end to reduce or avoid transfer of energy to the driver's low leg extremity is highly beneficial for brake pedal assemblies. However, the present invention also has application to other pedal assemblies, as a driver can also encounter front end collisions without noticing and having a chance to move his/her foot from a different pedal assembly.

The directional references used herein are made with the vehicle, and in particular the location of the driver (the driver's seat), as the point of reference. For example, a part of the pedal assembly that is rearward of another part is considered rearward relative to the vehicle. Moreover, such directional references with respect to movement are also relative to the vehicle as the point of reference. For example, movement of the brake actuator rod rearward towards the user, as discussed herein, is in reference to the vehicle direction. In a front-end collision situation, what happens from the perspective of a point of reference external to the vehicle is that, as the vehicle front end collapses, the remainder of the vehicle, including the passenger compartment with the driver therein, continues moving forwardly; thus, the driver is actually moving forward relative to the brake actuator rod from an external point of reference. Similarly, in a rear end collision, if the driver is propelled forward, the same type of relative motion may be involved. The net kinematics of the system of interest (i.e., the pedal assembly, brake actuator rod and the driver's lower leg extremity) during a collision are the same regardless of the point of reference used, i.e., whether the driver's leg and pedal arm are viewed as being forced forwardly against the brake actuator rod or the brake actuator rod is viewed as being forced rearwardly against the pedal arm and the driver's leg. Thus, for convenience and consistency, movement directions, including during collision situations, will be described relative to the vehicle as the point of reference, and in particular the driver location.

The pedal assembly 10 comprises a mounting bracket 14 for mounting the assembly 10 in the vehicle. Typically, the mounting is to the front wall of the passenger compartment, which is also known as a firewall. This is not intended to be limiting, and the mounting location could be to the floor or a structure under the vehicle dashboard, although front wall mounting is the more typical location. The specifics of the mounting bracket 14 and its mounting location are not essential and its construction and configuration as illustrated is not intended to be limiting.

In the illustrated embodiments, the mounting bracket 14 has a pair of spaced apart support members 16, 18 defining a pedal receiving space 20 therebetween. The support members 16, 18 extend rearwardly from a front bracket wall 22 that mounts to the front wall of the passenger compartment. The pedal receiving space 20 is open at least downwardly to allow the pedal arm 24, discussed below, to extend downwardly therefrom. The pedal receiving space 20 may also be open rearwardly towards the driver, or it may be closed in that direction. As will be discussed below, the pedal arm 24 and its associated components in the illustrated embodiment are installed by inserting them forwardly into the mounting bracket 14. In that approach, the pedal receiving space 20 would be open rearwardly at least during assembly. Thereafter, it may be left open rearwardly, or it may be closed off by a cover to prevent items from entering the area where the pedal arm 24 is connected. That installation approach is not limiting, and installation could be done in another manner. For example, two halves of a mounting bracket could be assembled to opposing lateral sides of the components associated with the pedal arm 24. Thus, the illustrated design and manner of assembly is not limiting.

The pedal arm 24 has an elongated configuration with a pedal pad 26 at a distal (also referred to as lower) end thereof for engagement by a driver's foot to move the rigid actuator 12 and actuate the functional system of the vehicle (e.g., the brake booster system). The manner in which the pedal arm 24 is mounted to the bracket 14 is discussed further below. The pedal arm 24 also has an actuator connector 30 between the distal end and the proximal (also referred to as upper) end for connection to the rigid actuator 12, e.g., the brake actuator rod. The actuator connector 30 may be of any type, and these are well-known in the art. As discussed at other points herein, because the actuator 12 is rigid, during a front-end collision it may be driven rearwardly towards the driver as the vehicle front end collapses, which (absent a release feature as discussed herein) in turn transmits kinetic energy into the driver's foot and lower leg if the driver has his/her foot engaged with or over the pedal pad 26 (which is typical of a driver attempting to apply the brake during such a situation).

The assembly 10 also includes a pair of retainer brackets 32, 34 on opposing sides of the proximal end of the pedal arm 24.

The assembly 10 also includes at least one pivot pin 36 pivotally connecting the proximal end of the pedal arm 24 to the pair of retainer brackets 32, 34. The illustrated embodiments shows a single pivot pin, which is inserted through an aperture in the proximal end of the pedal arm 24. However, the pedal arm 24 end could have two pins extending therefrom. In the illustrated embodiments, one or both sides of the pedal arm has a pin sleeve 37 extending laterally therefrom and providing the aperture. Such pin sleeves are optional. Alternatively, such integral structures could be used as the pivot pin 36 instead of having a separate support pin.

In the illustrated embodiments, the retainer brackets 32, 34 each have a slot 38, 40 formed therein and extending in the front-rear direction. The slots 38, 40 each have a wider location 42, 44 for retaining the pivot pin 36. The wider location 42, 44 has a shape corresponding to the pivot pin 36, which in this case is circular. Thus, the pivot pin 36 is restrained against movement within the slots 38, 40, and is fixed to the retainer brackets 32, 34. The pivot pin 36 may also be connected by through holes in the retainer brackets 32, 34 that are not part of the slots 38, 40. Thus, using the wider locations in the slots 38, 40 for retention of the pivot pin 36 is optional and not limiting.

In a non-limiting example of the assembly operation, the pedal arm 24 is pivotally connected to the retainer brackets 32, 34 by inserting the pivot pin 36 through the proximal end of the pedal arm 24, and then mounting the retainer brackets 32, 34 over the ends of the pivot pin 36. The pivot pin 36 may also have optional bushings 46, 48 slid over the ends thereof, which are received between the retainer brackets 32, 34 and the pedal arm 24 and inside the sleeves 37. As illustrated, the bushings 46, 48 may optionally have a radial flanges extending circumferentially between the sleeves and retainer brackets 32, 34.

The assembly 10 also comprises at least one support pin 50 coupled to the mounting bracket 12. In the illustrated design, a single support pin 50 is used, and it serves as a retention feature of the retainer brackets 32, 34. However, the support pin could also be constituted by multiple pins. For example, an embodiment could have two support pins extending inwardly from the mounting bracket 12 for engagement with the retainer brackets 32, 34, which pins may be integral with the bracket 14 or separate structures. Thus, the illustrated design is not limiting.

For retention on the support pin 50, each slot 38, 40 has a wider support pin location 52, 54 for retaining the retainer brackets 32, 34 in a retaining position thereof on the support pin 50. The wider support pin locations 52, 54 are located forwardly of the locations 42, 44 for the pivot pin 36 (and thus the pivot pin locations 42, 44 are located rearwardly of the support locations 52, 54).

The retaining position of the retainer brackets 32, 34 refers to the position in which the retainer brackets 32, 34 are secured against front-rear movement with respect to the mounting bracket 14. The retainer brackets 32, 34 are normally in this position, and this likewise prevents the pivot pin 36 and the proximal end of the pedal arm 24 from moving in the front-rear direction. In the illustrated embodiments, the retainer brackets 32, 34 in the retaining position thereof are retained on the support pin 50 to secure the retainer brackets 32, 34 against the front-rear movement with respect to the mounting bracket 14.

Figure 2:
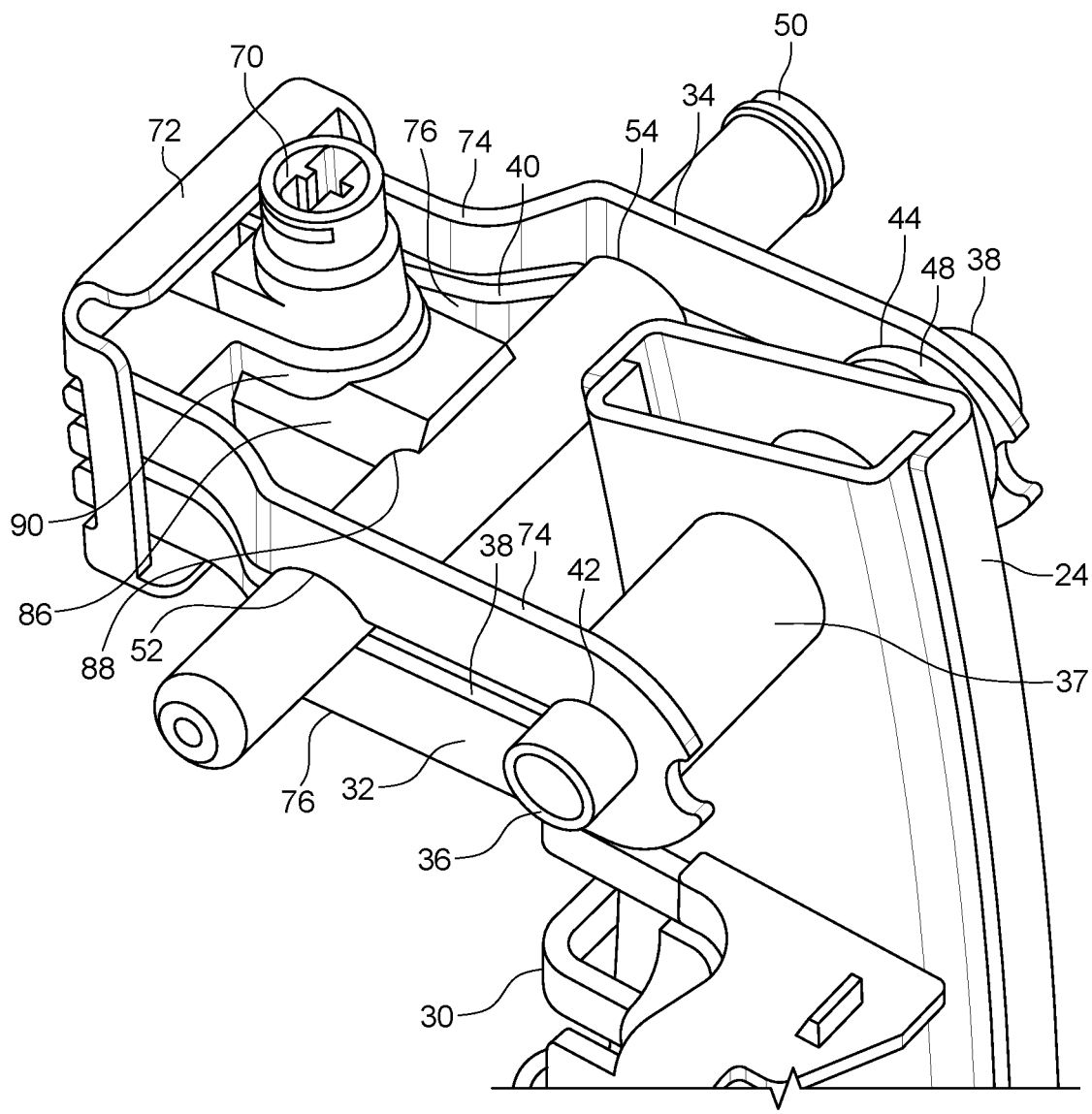
FIG. 2 is a close-up perspective view of a sub-assembly from FIG. 1 showing the pedal arm upper end and the components associated with mounting and pyrotechnic release, taken from the rear direction.
Figure 3:
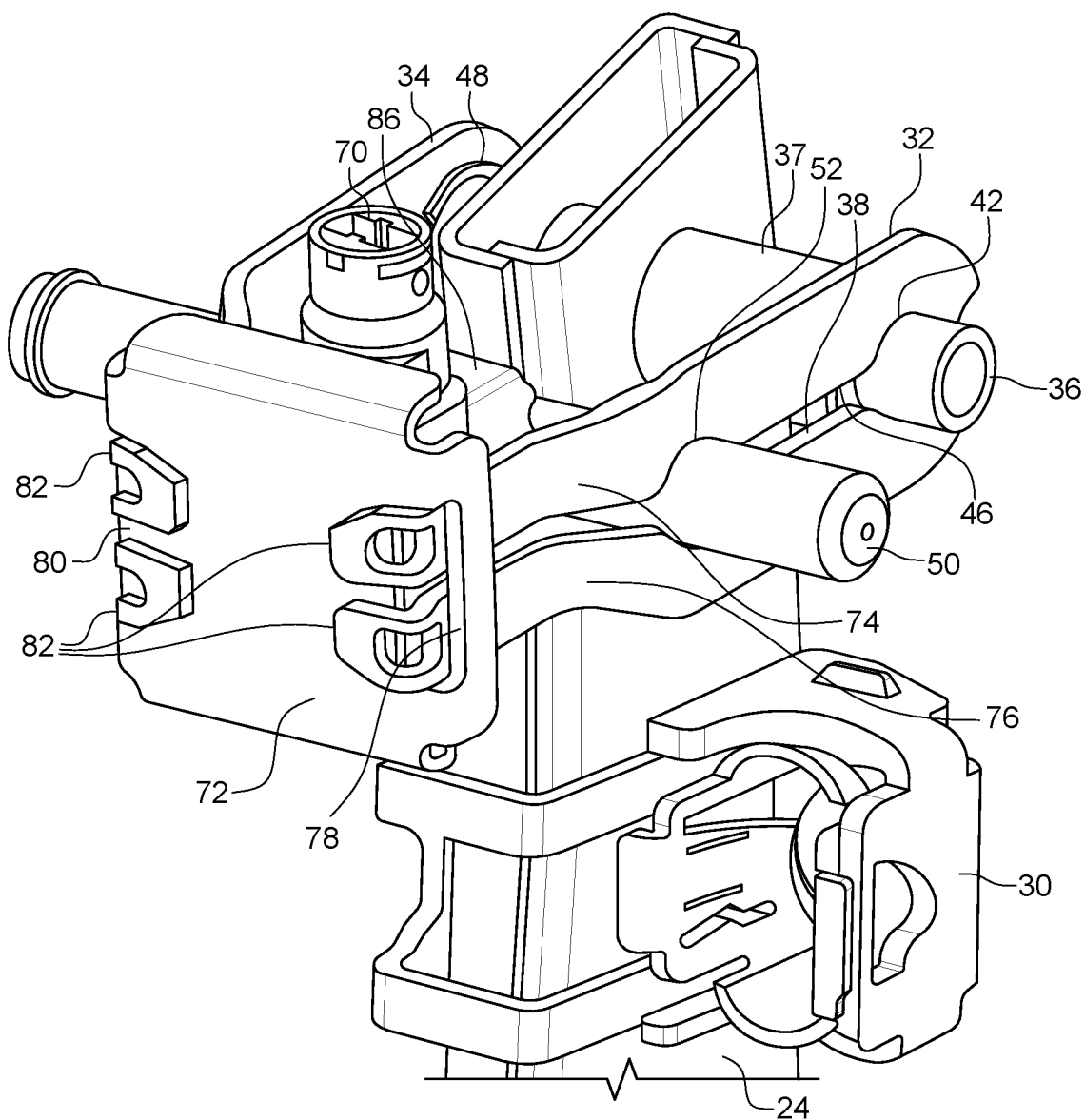
FIG. 3 is a view similar to FIG. 2, but taken from the forward direction.
Figure 4:
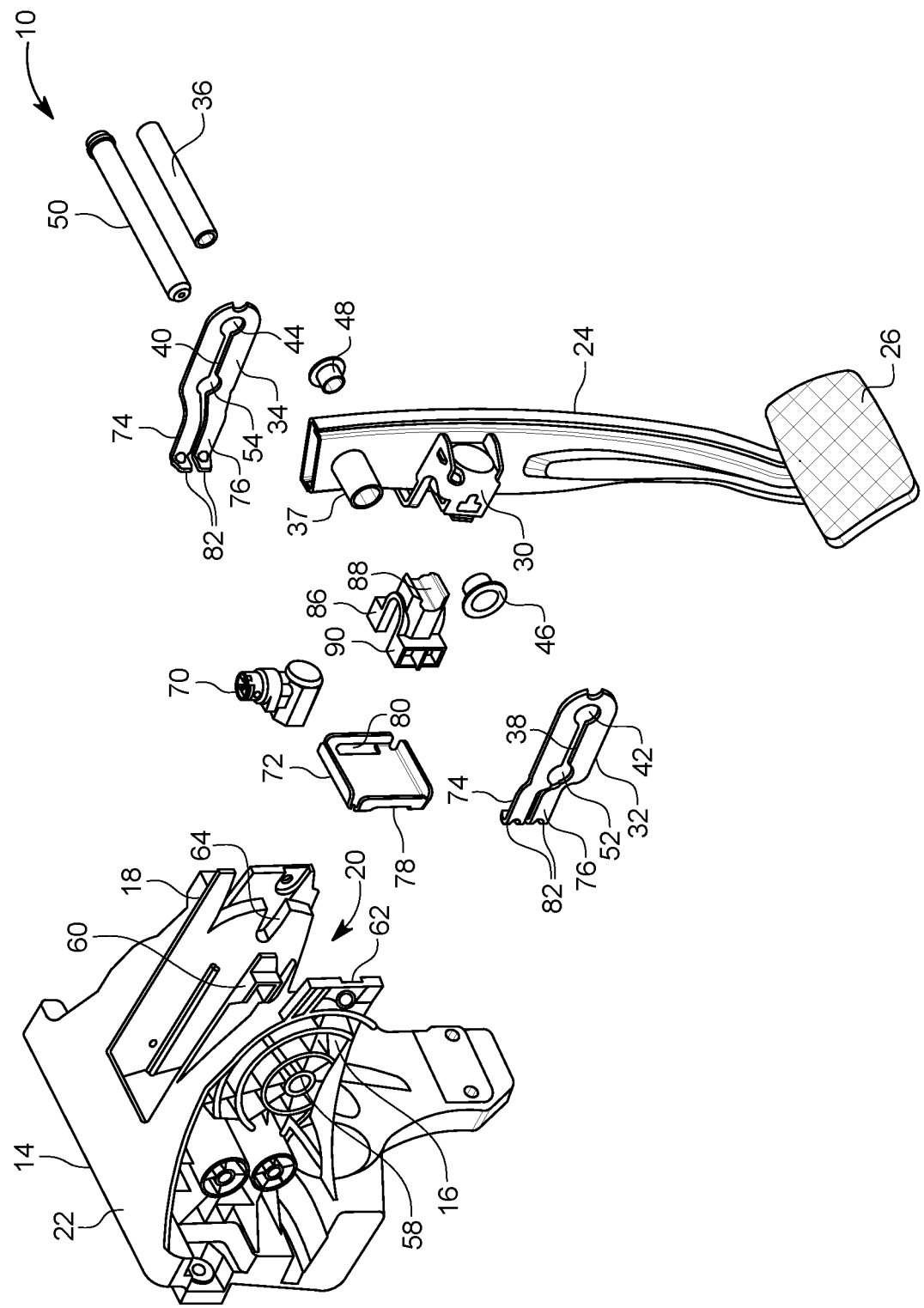
FIG. 4 is an exploded view of the pedal assembly of FIG. 1.
Figure 5:
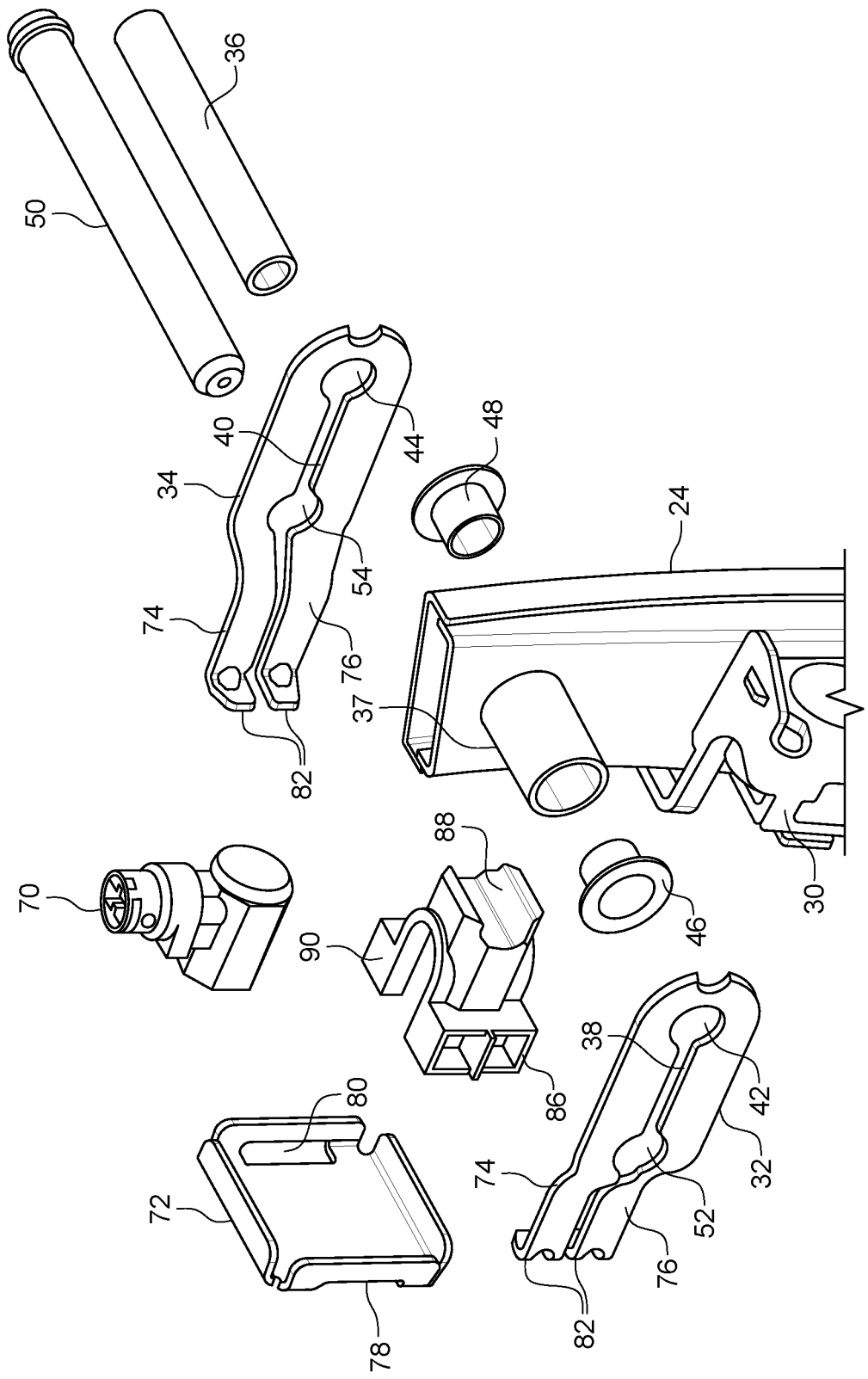
FIG. 5 is a view similar to FIG. 2, but exploded.

The retainer brackets 32, 34 with the pedal arm 24 and the pyrotechnic-related components (discussed below) mounted thereon in a non-limiting example may be mounted by inserting the sub-assembly thereof forwardly into the pedal receiving space 20 between the support members 16, 18. That inserted sub-assembly includes the parts in FIGS. 2, 3 and 5, except the support pin 50. The locations 52, 54 on the retainer brackets 32, 34 for receiving the support pin 50 are aligned with apertures 58, 60 on the support members 16, 18, and the support pin 50 is inserted therethrough. The support pin 50 may be secured by any suitable fastener or other means. The pivot pin 36 is also received in the illustrated embodiments in a pair of slots 62, 64 on the support members 16, 18, which face inwardly towards one another and may open rearwardly as illustrated. This arrangement provides two points of support for the sub-assembly, one at the support pin 50 and one at the pivot pin 36. The rearward opening on the slots 62, 64 may be used to allow for further rearward travel of the pivot pin 36 and the upper end of the pedal arm 24 during a release event, as discussed below. However, that is optional, and a sufficient amount of travel may also be allowed within the slots 62, 64 themselves.

The assembly 10 also includes a pyrotechnic actuator 70 having an input for receiving an actuating signal to trigger the pyrotechnic actuator 70. The signal may be from a crash sensor, such as an acceleration sensor or force impact sensor. The signal may come from a vehicle controller that receives signals from such sensors, or may come from such sensors directly. The designs of such sensors and control/actuation techniques are well-known for use in deployment of air bags and need not be detailed herein. The basic operation is that, upon detecting a collision (typically through sensing rapid deceleration or an impact), an electrical signal is transmitted to the pyrotechnic actuator, which ignites a charge to generate sufficient force to affect the release operation described below. The threshold setting for igniting the actuator 70 associated with the pedal assembly 10 may be the same or different from that used to ignite an air bag. For example, air bag deployment may have a lower setting for activation during collisions of lower force, whereas the pedal actuator may have a higher setting for activation during collisions of higher force. The selection of the threshold force for activation is typically selected by the vehicle manufacturer, and depends on the structural integrity of the vehicle, inclusion of other safety systems, etc. Any pyrotechnic actuator may be used, and the one shown is not limiting.

As shown in FIGS. 1-5, in some embodiments, the pyrotechnic actuator 70 is arranged with respect to the retainer brackets 32, 34 such that the pyrotechnic actuator 70 when triggered enables deformation of the retainer bracket 32, 34 to a releasing position wherein the retainer brackets 32, 34 permit the pivot pin 36 and the proximal end of the pedal arm 24 to move rearwardly with respect to the mounting bracket 14. In some embodiments, each of the retainer brackets 32, 34 is configured such that, when the pyrotechnic actuator 70 is triggered to enable deformation of the retainer bracket 32, 34 to the releasing position, the retainer brackets 32, 34 are released from the support pin 50 to permit the retainer brackets 32, 34, the pivot pin 36, and the proximal end of the pedal arm 24 to move rearwardly with respect to the mounting bracket 14. During a collision situation, if the actuator 12 is driven rearwardly towards the driver, instead of transferring a substantial portion of the kinetic energy into the driver's foot/lower leg by driving the pedal arm 24 about the pivot pin 36 to drive the pedal pad 26 rearwardly, the retainer brackets 32, 34, pivot pin 36 and pedal arm 24 proximal end are released due to the pyrotechnic action and will travel rearwardly instead. This substantially reduces or eliminates the transfer of kinetic energy to the driver's foot and lower leg. Again, as mentioned above, the same would apply to the driver were moving forwardly against the pedal pad 26.

With additional reference to FIGS. 1-5, in some embodiments, the pedal assembly 10 further comprises a releasable connector 72 connected to opposing, elongated slot defining portions 74, 76 on opposing sides of the slots 38, 40 of each retainer bracket 32, 34. The releasable connector 72 connects forward ends of the retainer brackets 32, 34 to secure the retainer brackets 32, 34 normally against front-rear movement with respect to the mounting bracket 14. In some embodiments, the releasable connector 72 secures the slot defining portions 74, 76 against deformation in the direction separating or diverging from one another (vertical in the Figures) to retain the retaining members 32, 34 on the support pin 50. As can be seen from the drawings, the connector 72 prevents those portions 74 from moving apart, which keeps the support pin locations 52, 54 engaged with the support pin 50, thus preventing rearward movement during normal conditions when the retainer brackets 32, 34 are in their retaining positions.

The connector 72 is positioned to be driven by the pyrotechnic actuator 70 when triggered such that the releasable connector 72 disconnects from the retainer brackets 32, 34. This enables the slot defining portions 74, 76 of each retainer bracket 32, 34 to deform and separate from one another (upwardly and downwardly in the drawings) to the releasing position for widening of the slots 38, 40, which releases the retainer brackets 32, 34 from the support pin 50. This widening action permits the retainer brackets 32, 34, the pivot pin 36, and the proximal end of the pedal arm 24 to move rearwardly with respect to the mounting bracket 14, as discussed above. In the illustrated design, this occurs because the release of the connector 72 frees the portions 74, 76 to be deformed apart from one another. As the kinetic energy of the rigid actuator 12 is applied rearwardly to the pedal arm 24, those portions 74, 76 can then deform away from each other over the support pin 50 to the releasing position, thus releasing the retainer brackets 32, 34 for rearward movement together with the pivot pin 36 and the pedal arm proximal end. The energy required to deform the retainer brackets 32, 34 is substantially lower than that which will injure the driver, thus providing pedal release in preference. As mentioned above, the kinematics here are described with reference to the vehicle as the frame of reference, and thus the relative motion would be essentially the same if the rigid actuator 12 remained stationary and the driver is moving forwardly against the pedal pad 26 and pedal arm 24, which would likewise deform the release brackets 32, 34 over the support pin 50. That is, the kinetic energy of the driver could perform the same action. The invention is not limited to any particular energy threshold for preferential release, and that may vary between pedal assemblies, such as due to different geometries, materials, installation locations, etc.

In some embodiments, each slot 38, 40 has an open forward end. That is, the slots 38, 40 extend entirely to the forward ends of the brackets 32, 34 and the slot defining portions 74, 76 of each retainer bracket 32, 34 are legs that are separated for the entire length of the slots 38, 40, terminating in free forward ends. Each slot defining portion 74, 76 has a forward end thereof extending through a corresponding opening 78, 80 in the releasable connector 72 to secure the slot defining portions 74, 76 against deformation. As shown, a single opening 78, 80 on each lateral side of the connector 72 receives both ends of the slot defining portions 74, 76, but two openings on each could also be used (i.e., one opening for each end of portions 74, 76). Each forward end may also have a flange 82 for retaining the releasable connector 72 thereon. When the releasable connector 72 is driven forwardly by the pyrotechnic actuator 70, it deforms the flanges 82 to disconnect the connector 72 from the retainer brackets 32, 34. The use of flanges is optional, and the securement could be affected by other fasteners, including welding, rivets, snap-fit, etc. Also, the front-rear retention of the releasable connector 72 could also be built into the mounting bracket 14, such as by snap-fit locators, tabs, detents or the like.

In some embodiments, the slot ends may also be closed, which may be by a weak connection to reduce the force required for the deformation discussed above. Thus, only one opening 78, 80 corresponding to each retainer bracket 52, 54 would be used. The connector 72 would still serve the function of providing structural support against deformation of the retainer bracket portions 74, 76 (in the vertical direction as illustrated).

As illustrated, the releasable connector 72 is a plate. It may have other shapes or configurations. For example, it could be shaped as a bar or have any other suitable configuration. It also need not be a separate component. For example, the two retainer brackets 32, 34 could be formed as a unitary or one-piece member bent into a general U-shape, with the bight portion of the U serving as the connector member 72. In such a design, the bight portion/connector member could be connected to the two main parts of the retainer brackets 32, 34 by structurally weaker connections, such as areas of thin cross-section or areas notched for mechanical weakening. This can perform the function of preventing the slot from widening during normal conditions, while breaking away for release when driven by the actuator 70 during a collision.

In another alternative approach, the slots 38, 40 could have closed ends and the connector member 72 may be a bar, rod or pin inserted into the slots 38, 40 at the end thereof. The pyrotechnic actuator 70 when actuated could drive that connector member 72 forwardly, thus breaking the closed ends of the slots 38, 40 to free the slot defining portions 74, 76 for deformation apart from one another for release from the support pin 50.

In some embodiments, the pyrotechnic actuator 70 is mounted between the support pin 50 and the releasable connector 72. Thus, the actuator 70 functions to drive the connector 72 forwardly, and bears against the support pin 50 as a stationary reaction surface. Optionally, a mount 86 is provided for mounting the actuator 70. As illustrated, the mount 86 has a groove 88 for engagement with the support pin 50 and a receptacle or seat 90 for holding the actuator 70.

In other embodiments, the pyrotechnic actuator 70 can be mounted forwardly of the releasable connector 72 and be actuated to pull the connector 72 forwardly, rather than pushing it. Thus, the particular mounting location is not critical. The location illustrated forward of the support pin 50 has the advantage of shielding the pyrotechnic action from being near the user, as it is behind the support pin 50, the pivot pin 36, and the pedal arm 24. If the actuator 70 is located forward of the connector 72, more shielding may be provided.

The pyrotechnic actuator 70 has been described herein as enabling deformation of the retainer brackets 32, 34 to the releasing position for release, such as from the support pin 50. Enabling deformation includes the function of creating a condition where such release can happen, and not just directly causing the deformation. In some embodiments, as explained above, the actuator 70 releases the connector 72. That action by itself does not directly deform the release brackets 32, 34 to the releasing position, and instead the release of the connector 72 enables the kinetic energy of the rigid actuator 12 to cause the deformation and force the portions 74, 76 apart over the support pin 50. Again, as mentioned above, the kinematics here are described with reference to the vehicle as the frame of reference, and thus the relative motion would be the same if the rigid actuator 12 remained stationary and the driver is moving forwardly against the pedal pad 26 and pedal arm 24, which would likewise deform the release brackets 32, 34 over the support pin 50. In other embodiments, it is also possible for the actuator 70 to enable deformation by directly causing deformation. For example, the actuator 70 could be oriented vertically to drive the portions 74, 76 when actuated, thus causing the deformation directly. In such a design, the connector 72 may be entirely omitted, and the slots could be closed-ended to resist deformation (with the closed-end being broken away by the force of the actuator 70).

In another embodiment, the support pin 50 could be eliminated, and the retainer brackets 32, 34 could be retained against movement in a front-rear direction in the retaining position thereof by the releasable connector 72. In such a design, the releasable connector 72 or the mounting bracket 14 would include features to prevent at least rearward movement of the connector 72 (and possibly movement in both directions). For example, the mounting bracket 14 could have tabs, detents, projections, inserts, fasteners or other structures that prevent the connector plate 72 from moving rearward, and the engagement of the pivot pin 36 in its slots 62, 64 could prevent the components against forward movement during normal use. In such a design, the releasable connector 72 could be driven forwardly for disconnection from the retainer brackets 32, 34 by the pyrotechnic actuator 70 in the same manner as discussed above or a similar manner, and the actuator 70 could bear against another structure, such as a feature on the mounting bracket 14. As an example, the pyrotechnic driving of the connector 72 may cause folding, bending, or other deformation thereof to permit it to move forwardly from retaining features on the mounting bracket 14, such retaining features could be broken away or deflect, or a combination of both approaches could be used. In this design, the retainer brackets 32, 34 need not deform over the support pin 50 to travel rearwardly with the pivot pin 36 and pedal arm proximal end, and thus they can be designed more simply, including without the slots 38, 40.

Figure 6:
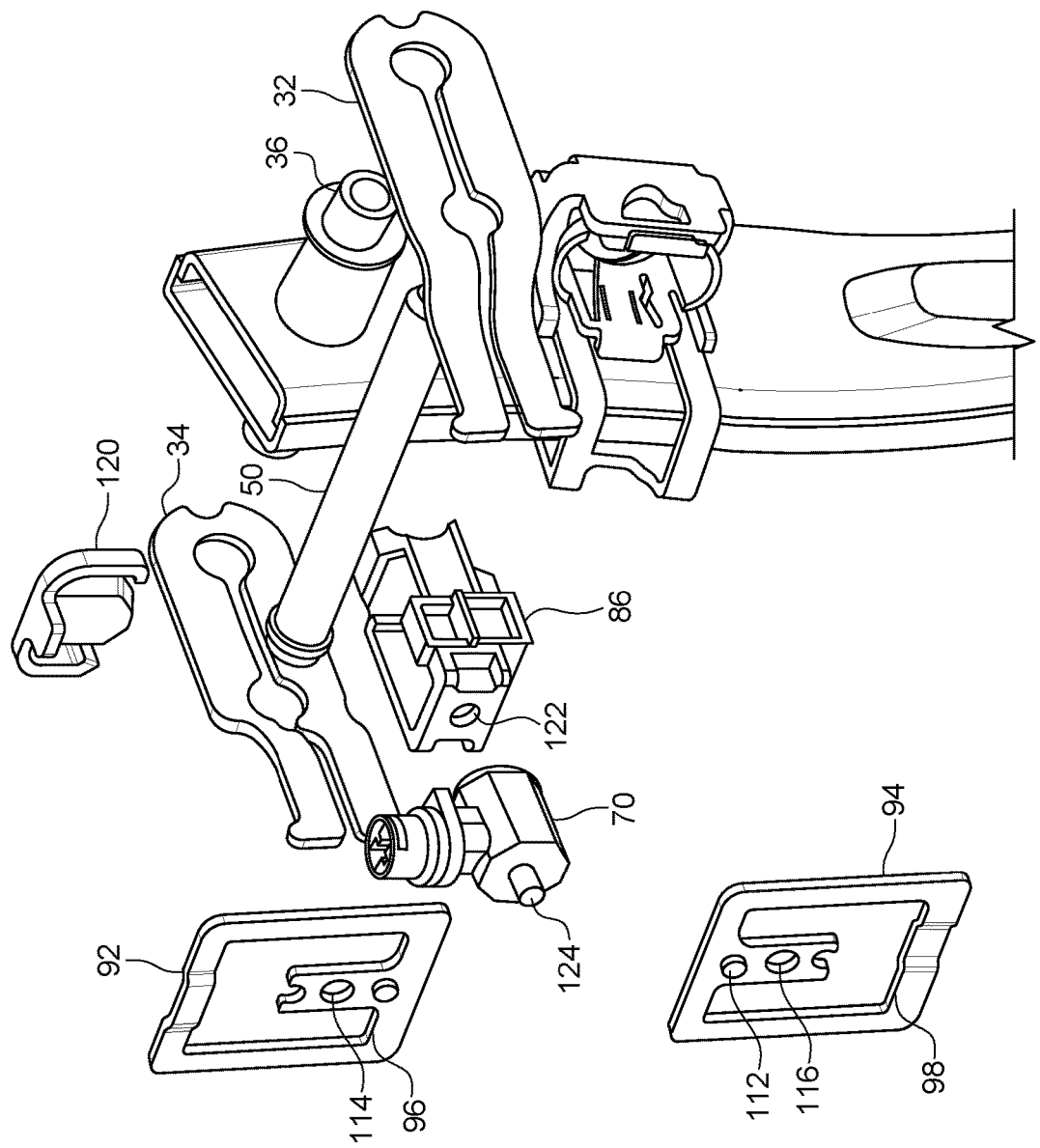
FIG. 6 is an exploded view of an embodiment of a portion of the pedal assembly with the option for post collision pedal control.
Figure 8:
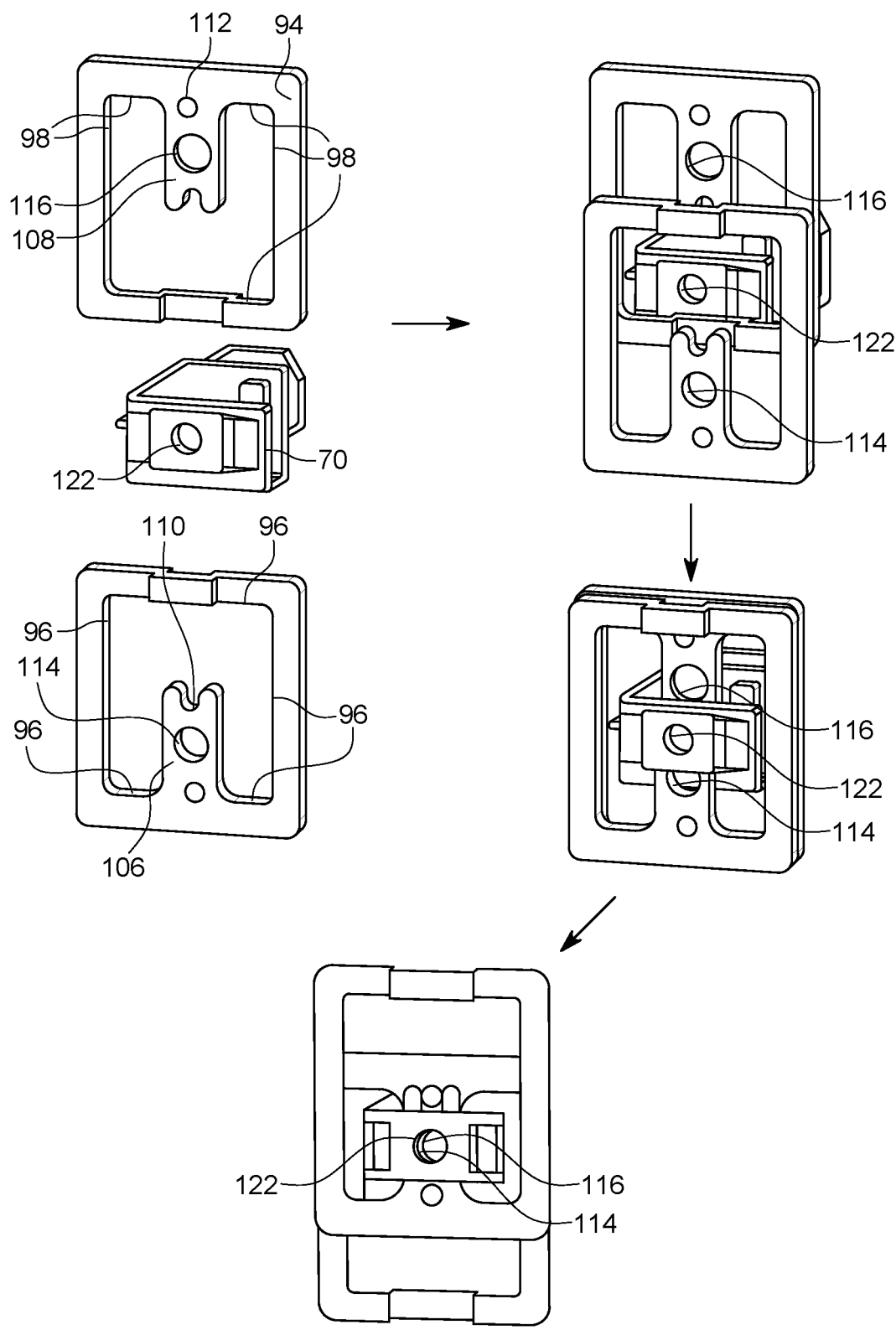
FIG. 8 is a view detailing restraining connectors used in some embodiments.

Turning to FIG. 6, in some embodiments, the connector 72 may be two restraining connectors 92, 94. The restraining connectors 92, 94 each have an interior surface 96, 98 shown as an inner edge that defines an interior opening 100, 102 through which the retainer bracket portions 74, 76 may extend. As illustrated in FIG. 8, the restraining connectors each have an interior feature 106, 108 shown as a tab extending from the interior surface 96, 98 into the interior opening. At a location between the distal end and the interior surface 96, 98 is an aperture 114, 116 for receiving the movable portion 124 (e.g. pin, latch, some other retaining structure) of the pyrotechnic actuator 70. Optionally, at the distal end of each interior feature 106, 108, there is a receiving groove 110 that is configured to receive the alignment boss 112 of the opposing restraining connector 92, 94 at a location that provides alignment of apertures 114, 116.

Figure 7A:
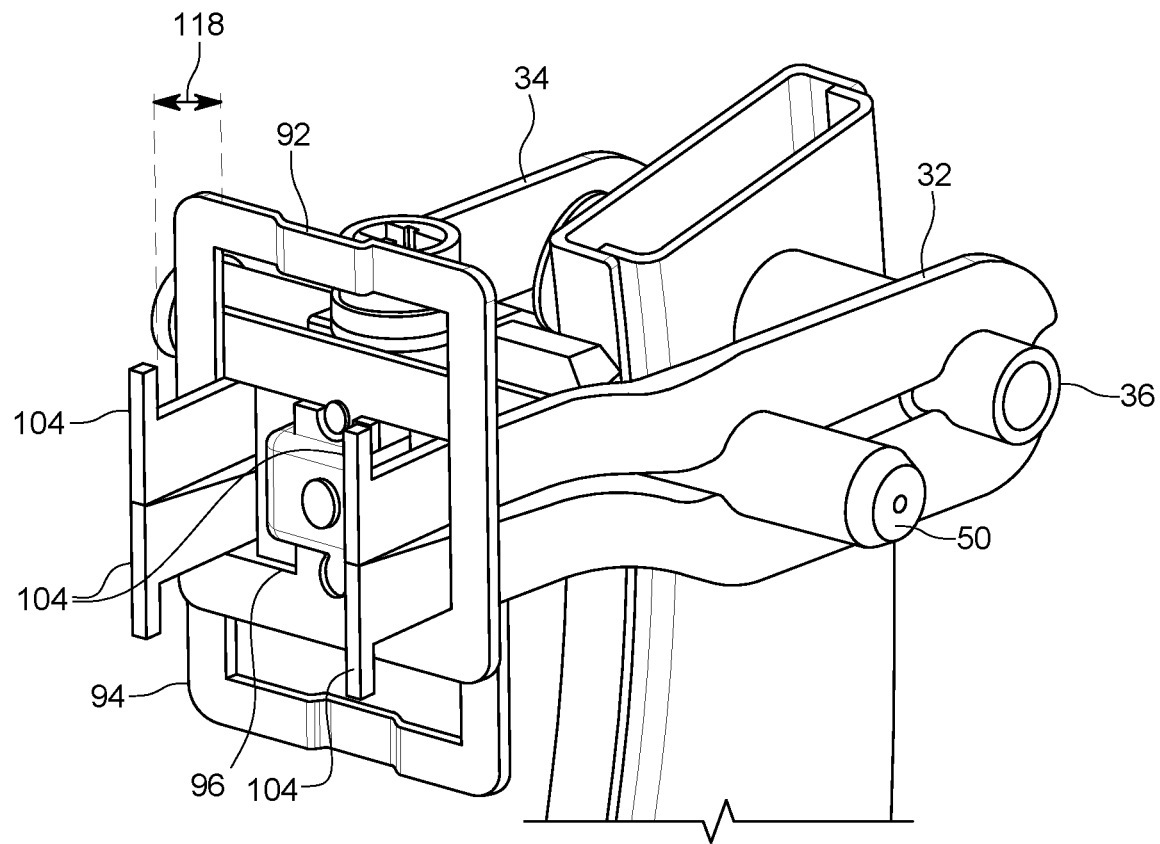
FIG. 7A is a view of an embodiment similar to FIG. 6, also with the option for post-collision pedal control.

Still referring to FIGS. 6 and 8, in some embodiments, each of the restraining connectors 92, 94 are installed in an orientation opposite relative to each other, slid together in an overlapping manner. Optionally, the restraining connectors 92, 94 are structurally identical. The restraining connectors 92, 94 are installed in an offset configuration shown in FIG. 8 where the top and bottom portions of interior surfaces 96 and 98 are not substantially aligned with each other. In the installed configuration, the apertures 114 and 116 are aligned and a movable portion 124 of the pyrotechnic actuator 70 is disposed inside of apertures 114 and 116 and constrains movement of the restraining connectors 92, 94. In the installed configuration, restraining connectors 92, 94 secure the slot defining portions 74, 76 against deformation in the direction separating or diverging from one another (vertical in the Figures) to retain the retaining members 32, 34 on the support pin 50. For example, FIG. 7A shows the bottom portion of interior surface 92 secures the slot defining portion 76 from deforming downward and the top portion of interior surface 94 secures the slot defining portion 74 from deforming upward. As can be seen from the drawings, the restraining connectors 92, 94 prevents those portions 74, 76 from moving apart, which keeps the support pin locations 52, 54 engaged with the support pin 50, thus preventing rearward movement during normal conditions when the retainer brackets 32, 34 are in their retaining positions.

In some embodiments, the pyrotechnic actuator 70 is a puller type actuator (i.e., pulls the movable portion 124 into the body of the actuator) disposed within a mount 86 for the actuator. Optionally, a pyrotechnic backstop 120 may be disposed adjacent to the pyrotechnic actuator 70 and opposite the movable portion 124 of the pyrotechnic actuator 70. For example, the backstop 120 is fixedly disposed within the mount 86 and to the rear of the pyrotechnic actuator 70. The backstop 120 serves to help keep the movable portion 124 of the pyrotechnic actuator 70 disposed within the apertures 114, 116 while in the installed configuration. The mount 86 may feature an aperture 122 for a desired spacing of the movable portion 124 of the pyrotechnic actuator 70. In other words, the mount aperture 122 may be configured to ensure, when in the installed configuration, the movable portion 124 of the actuator 70 is disposed within the connector apertures 114, 116. At the same time, in a post collision configuration (i.e., after activation of the pyrotechnic actuator 70), the mount aperture 122 would also enable the movable portion 124 of the pyrotechnic actuator is completely removed from the connector apertures 114, 116. While in the exemplary illustrated embodiments, the pyrotechnic actuator 70 is disposed in a location behind the restraining connectors 92, 94, some embodiments may feature alternative mounting locations (e.g., in front of, above, below the restraining connectors). In some embodiments, the movable portion 124 of the pyrotechnic actuator 70 may be disposed outside of the apertures 114, 116 in the installed configuration and instead cause some other member to be removed from the apertures 114, 116 during a collision (e.g., through a mechanical power transmission device, through a linkage).

In the illustrated embodiment, as seen best in FIG. 8, the mount 86 has a wall 121 in which the mount aperture 122 is received, and as an option that wall 121 is position to receive the tabs 104, 106 of the restraining connectors 92, 94. This configuration helps secure the restraining connectors 92, 94 in place until such time as the movable portion/pin 124 of the pyrotechnic actuator 70 is activated for withdrawal from the apertures 122, 114, 116.

In some embodiments, the restraining connectors may move from the installed offset configuration to a post collision configuration where the interior surfaces 96, 98 are aligned (as a result of the pyrotechnic actuator being triggered). During a collision, the pyrotechnic action moves (e.g., moves rearward, pulls) the movable portion 124 of the pyrotechnic actuator out of apertures 114, 116 thereby releasing (e.g., allowing movement, allowing vertical movement) of the restraining connectors 92, 94 to a position where the interior surfaces 96, 98 are substantially aligned. In this post collision configuration, the movement of the restraining connectors 92, 94 allows the slot defining portions 74, 76 to deform in the direction separating or diverging from one another (vertical in the Figures) into a releasing position. For example, the slot defining portions 74, 76 are free to deform vertically to a point where the interior surfaces 96, 98 are substantially aligned (i.e., the slot defining portions 74, 76 are constrained by the height of the interior openings 100, 102 of the restraining connectors 92, 94). In this configuration the retainer brackets 32, 34, pivot pin 36 and pedal arm 24 proximal end may travel rearwardly. This substantially reduces or eliminates the transfer of kinetic energy to the driver's foot and lower leg. Again, as mentioned above, the same would apply if the driver were moving forwardly against the pedal pad 26.

Figure 7B:
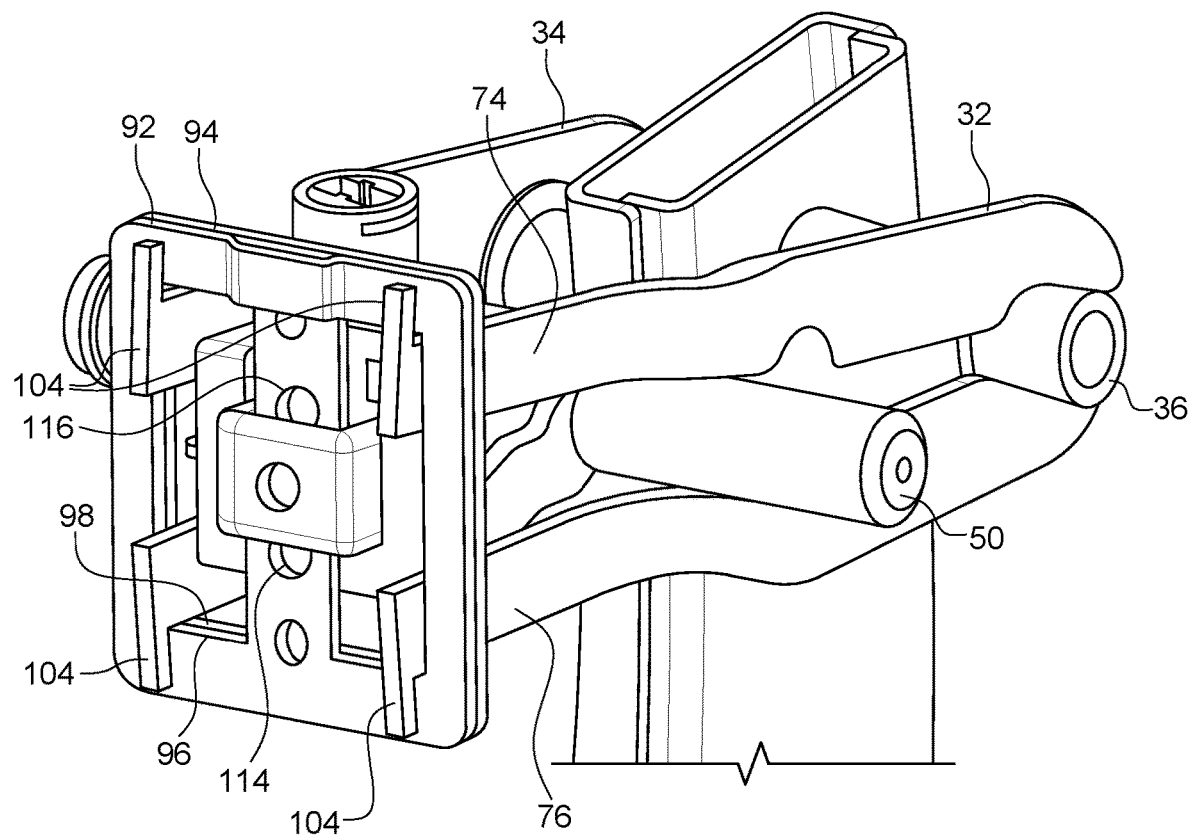
FIG. 7B is a view similar to FIG. 7A, but shown in the post-collision configuration.

Now referring to FIGS. 6 and 7A-7B, in some embodiments, the pedal assembly 10 could be configured to retain a level of functionality or control after a collision. In such a design, pressing the pedal pad 26 after a collision would still allow some control over the system corresponding to the type of actuator 12 (e.g., to control a brake booster, amount of fuel delivered to an engine, or engage/disengage a clutch). This type of design is preferable when the vehicle is otherwise capable of some level of operation after a collision and the driver still needs to use any of the pedals (e.g., brake pedal, throttle pedal, clutch pedal). the forward end of retainer brackets 32, 34 may be configured to have end-stops 104. In the installed configuration, illustrated in 7A, the end-stops 104 may be disposed some distance 118 forward of the most forward restraining connector 92. Preferably, four end-stops 104 are used in an assembly, but other amounts may be used. In a post collision configuration, illustrated in 7B, the end-stops 104 restrict rearward movement of the pivot pin 36 so that the total rearward displacement of pivot pin 36 is no greater than distance 118. In some embodiments, the rearward movement of the pivot pin 36 after a collision is restricted to a displacement no greater than some distance proportional to distance 118. The constraint of the end-stops 104 still allows the transfer of kinetic energy to the driver's foot and lower leg to be substantially reduced or eliminated during a collision, while preserving post-crash functionality of the pedal pad 26. For example, by restricting rearward movement of the pivot pin 36, pressing the pedal pad 26 would still permit the pedal arm 24 to pivot about the pivot pin 36 and thereby preserve some level of control over system corresponding to the type of actuator 12 (e.g., to control a brake booster, amount of fuel delivered to an engine, or engage/disengage a clutch). FIG. 6 also has end-stops 104, which are less pronounced, but also perform the same function.

In other embodiments, in the installed configuration, one or more of the end-stops 104 may rest against one or more of the restraining connectors 92, 94 or otherwise be connected to one or both restraining connectors. In such embodiments, the end-stops 104 may restrict the rearward movement of the pivot pin 36 after a collision to a displacement no greater than a predetermined distance 118*a*. For example, the end-stops 104 could be in contact with (e.g., connected to, held against) one or both restraining connectors 92, 94 by a deformable member (e.g., a spring, biasing member) with a designed deformation distance 118*a*. The restriction of rearward movement by the end-stops 104 in these embodiments still preserve some functionality of the pedal pad 26 as previously mentioned above.

Figure 9:
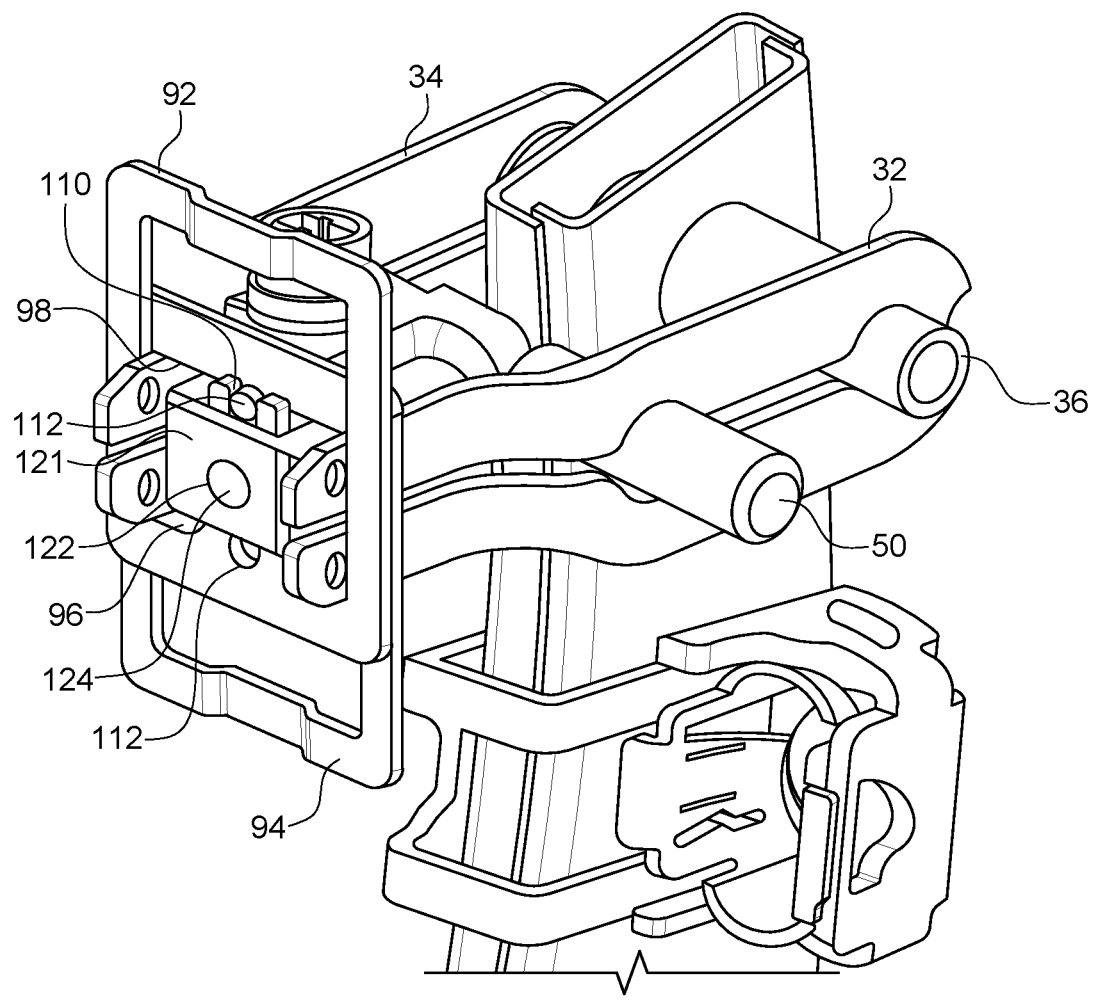
FIG. 9 is a view of an embodiment similar to FIG. 6, but without the option for post-collision control.

FIG. 9 shows another embodiment similar to FIG. 6 (and thus common reference numbers are used for the same components). The embodiment of FIG. 9, however, does not include the end stops 104, and thus is not designed for post-collision control. Thus, post-collision control is an option, rather than a requirement.

The foregoing illustrated embodiment(s) have been provided solely to illustrate the structural and functional principles of the present invention, and are not intended to be limiting. To the contrary, the present invention includes all modifications, substitutions, alterations, and/or equivalents within the spirit and scope of the following claims.

What is claimed:

1. A pedal assembly for actuating a rigid actuator of a functional system in a motor vehicle, comprising
    a mounting bracket for mounting the assembly in the vehicle, the mounting bracket having spaced apart support members defining a pedal receiving space therebetween;
    a pedal arm having a pedal pad at a distal end thereof for engagement by a driver's foot, the pedal arm also having an actuator connector between the distal end and a proximal end for connection to the rigid actuator;
    at least one support pin coupled to the mounting bracket;
    a pair of retainer brackets on opposing sides of the proximal end of the pedal arm, each retainer bracket normally being in a retaining position retained on the at least one support pin against movement in a front-rear direction with respect to the mounting bracket;
    at least one pivot pin pivotally connecting the proximal end of the pedal arm to the pair of retainer brackets;
    a pyrotechnic actuator having an input for receiving an actuating signal to trigger the pyrotechnic actuator;
    the pyrotechnic actuator being arranged with respect to the retainer brackets such that the pyrotechnic actuator when triggered enables deformation of the retainer brackets to a releasing position wherein the retainer brackets permit the at least one pivot pin and the proximal end of the pedal arm to move rearwardly with respect to the mounting bracket;
    wherein the pyrotechnic actuator is mounted forwardly of the at least one support pin, the at least one pivot pin and the pedal arm for shielding the driver from pyrotechnic action thereof.

2. A pedal assembly according to claim 1, wherein the at least one pivot pin is a single pivot pin.

3. A pedal assembly, for actuating a rigid actuator of a functional system in a motor vehicle, comprising
    a mounting bracket for mounting the assembly in the vehicle, the mounting bracket having spaced apart support members defining a pedal receiving space therebetween;
    a pedal arm having a pedal pad at a distal end thereof for engagement by a driver's foot, the pedal arm also having an actuator connector between the distal end and a proximal end for connection to the rigid actuator;
    at least one support pin coupled to the mounting bracket;
    a pair of retainer brackets on opposing sides of the proximal end of the pedal arm, each retainer bracket normally being in a retaining position retained on the at least one support pin against movement in a front-rear direction with respect to the mounting bracket;
    at least one pivot pin pivotally connecting the proximal end of the pedal arm to the pair of retainer brackets;

a pyrotechnic actuator having an input for receiving an actuating signal to trigger the pyrotechnic actuator;

the pyrotechnic actuator being arranged with respect to the retainer brackets such that the pyrotechnic actuator when triggered enables deformation of the retainer brackets to a releasing position wherein the retainer brackets permit the at least one pivot pin and the proximal end of the pedal arm to move rearwardly with respect to the mounting bracket;

wherein each of the retainer brackets is configured such that, when the pyrotechnic actuator is triggered to enable deformation of the retainer brackets to the releasing position, the retainer brackets are released from the at least one support pin to permit the retainer brackets, the at least one pivot pin, and the proximal end of the pedal arm to move rearwardly with respect to the mounting bracket.

4. A pedal assembly according to claim 3, wherein each retainer bracket has a slot extending in the front-rear direction, and each slot has a wider support pin location for retaining the retainer brackets on the at least one support pin in the retaining position thereof.

5. A pedal assembly according to claim 4, wherein the slot of each support bracket also has a wider pivot pin location for retaining the at least one pivot pin, the pivot pin locations being positioned rearward of the support pin locations.

6. A pedal assembly according to claim 4, further comprising a releasable connector connected to slot defining portions on opposing sides of the slot of each retainer bracket to secure the slot defining portions against deformation separating from one another to retain the retaining brackets on the at least one support pin, the releasable connector being positioned to be driven by the pyrotechnic actuator when triggered such that the releasable connector disconnects from the retainer brackets to enable the slot defining portions of each retainer bracket to deform and separate from one another to the releasing position for widening of the slots to release the retainer brackets from the at least one support pin to permit the retainer brackets, the at least one pivot pin, and the proximal end of the pedal arm to move rearwardly with respect to the mounting bracket.

7. A pedal assembly according to claim 6, wherein the at least one support pin is a single support pin.

8. A pedal assembly according to claim 7, wherein the pyrotechnic actuator is mounted between the support pin and the releasable connector.

9. A pedal assembly according to claim 6, wherein the pyrotechnic actuator is mounted between the at least one support pin and the releasable connector.

10. The pedal assembly according to claim 6, wherein each slot has an open forward end.

11. A pedal assembly according to claim 10, wherein each slot defining portion has a forward end thereof extending through a corresponding opening in the releasable connector to secure the slot defining portions against deformation, each forward end having a flange for retaining the releasable connector thereon, wherein the releasable connector when driven forwardly by the pyrotechnic actuator deforms the flanges to disconnect the releasable connector from the retainer brackets.

12. A pedal assembly according to claim 11, wherein the releasable connector is a plate.

13. A pedal assembly according to claim 11, wherein the at least one support pin is a single support pin.

14. A pedal assembly according to claim 13, wherein the pyrotechnic actuator is mounted between the support pin and the releasable connector.

15. A pedal assembly according to claim 6, wherein each retainer bracket has a forward end thereof extending through a corresponding opening in the releasable connector to secure the slot defining portions against deformation.

16. A pedal assembly according to claim 15, wherein the releasable connector is a plate.

17. A pedal assembly according to claim 15, wherein the at least one support pin is a single support pin.

18. A pedal assembly according to claim 17, wherein the pyrotechnic actuator is mounted between the support pin and the releasable connector.

19. A pedal assembly according to claim 15, wherein each forward end has at least one flange for retaining the releasable connector thereon, wherein the releasable connector when driven forwardly by the pyrotechnic actuator deforms the flanges to disconnect the releasable connector from the retainer brackets.

20. A pedal assembly according to claim 19, wherein the releasable connector is a plate.

21. A pedal assembly according to claim 19, wherein the at least one support pin is a single support pin.

22. A pedal assembly according to claim 21, wherein the pyrotechnic actuator is mounted between the support pin and the releasable connector.

23. A pedal assembly according to claim 6, wherein the releasable connector is a plate.

24. A pedal assembly according to claim 3, wherein the at least one support pin is a single support pin.

25. A pedal assembly for actuating a rigid actuator of a functional system in a motor vehicle, comprising
a mounting bracket for mounting the assembly in the vehicle, the mounting bracket having spaced apart support members defining a pedal receiving space therebetween;
a pedal arm having a pedal pad at a distal end thereof for engagement by a driver's foot, the pedal arm also having an actuator connector between the distal end and a proximal end for connection to the rigid actuator;
a pair of retainer brackets on opposing sides of the proximal end of the pedal arm;
a releasable connector connecting forward ends of the retainer brackets to secure the retainer brackets normally against movement in a front-rear direction with respect to the mounting bracket;
at least one pivot pin pivotally connecting the proximal end of the pedal arm to the pair of retainer brackets;
a pyrotechnic actuator having an input for receiving an actuating signal to trigger the pyrotechnic actuator;
the pyrotechnic actuator being arranged with respect to the releasable connector such that the pyrotechnic actuator when triggered drives the releasable connector to disconnect from the retainer brackets to permit the retainer brackets, the at least one pivot pin and the proximal end of the pedal arm to move rearwardly with respect to the mounting bracket.

26. A pedal assembly for actuating a rigid actuator of a functional system in a motor vehicle, comprising
a mounting bracket for mounting the assembly in the vehicle, the mounting bracket having spaced apart support members defining a pedal receiving space therebetween;
a pedal arm having a pedal pad at a distal end thereof for engagement by a driver's foot, the pedal arm also having an actuator connector between the distal end and a proximal end for connection to the rigid actuator;
a pair of retainer brackets on opposing sides of the proximal end of the pedal arm;

a pair of restraining connectors connecting forward ends of the retainer brackets to secure the retainer brackets normally against movement in a front-rear direction with respect to the mounting bracket;

at least one pivot pin pivotally connecting the proximal end of the pedal arm to the pair of retainer brackets;

a pyrotechnic actuator having an input for receiving an actuating signal to trigger the pyrotechnic actuator;

the pyrotechnic actuator being arranged with respect to the pair of restraining connectors such that the pyrotechnic actuator when triggered permits movement of the pair of restraining connectors apart from one another to permit the pair of retainer brackets, the at least one pivot pin and the proximal end of the pedal arm to move rearwardly with respect to the mounting bracket.

27. A pedal assembly according to claim 26, wherein the pair of retainer brackets each comprise a pair of slot defining portions, wherein the movement of the pair of restraining connectors apart from one another further permits vertical separation of each of the pairs of slot defining portions.

28. A pedal assembly according to claim 27, further comprising at least one support pin coupled to the mounting bracket, each retainer bracket normally being secured on the at least one support pin against movement in the front-rear direction with respect to the mounting bracket;

wherein the pair of restraining connectors is positioned to be released by a movable portion of the pyrotechnic actuator when triggered such that the restraining connectors move apart from one another to enable the slot defining portions of each retainer bracket to deform and separate from one another to a releasing position for widening of the slots to release the retainer brackets from the at least one support pin to permit the retainer brackets, the at least one pivot pin, and the proximal end of the pedal arm to move rearwardly with respect to the mounting bracket.

29. A pedal assembly according to claim 27, wherein the pair of retainer brackets further comprises at least one end-stop.

30. A pedal assembly according to claim 29, wherein the at least one end-stop restricts rearward movement of the at least one pivot pin to permit a level of pedal functionality after the pyrotechnic actuator has been triggered.

31. A pedal assembly according to claim 30, wherein the rearward movement of the at least one pivot pin is restricted to a total rearward displacement no greater than a predetermined distance.

32. A pedal assembly according to claim 31, wherein the predetermined distance is proportional to the distance between the at least one end-stop and the pair of restraining connectors before the pyrotechnic actuator is triggered.

33. A pedal assembly according to claim 27, wherein each of the restraining connectors comprises an aperture.

34. A pedal assembly according to claim 33, wherein the pyrotechnic actuator comprises a movable portion, wherein the movable portion is disposed inside the aperture of each of the restraining connectors in an installed configuration, wherein triggering the pyrotechnic actuator permits movement of the pair of restraining connectors apart from one another by removing the movable portion of the actuator from the aperture of each of the restraining connectors.

35. A pedal assembly according to claim 34, wherein each of the restraining connectors further comprises an interior surface, wherein the movement of the restraining connectors apart from one another is restricted past a point where both of the interior surfaces are substantially aligned.

* * * * *